United States Patent [19]
Stoll

[11] 3,778,885
[45] Dec. 18, 1973

[54] METHOD FOR THE MANUFACTURE OF PLUTONIUM-CONTAINING NUCLEAR FUEL RODS

[75] Inventor: Wolfgang Stoll, Hanau, Germany
[73] Assignee: ALKEM GmbH, Hanau, Germany
[22] Filed: July 24, 1972
[21] Appl. No.: 274,654

[30] Foreign Application Priority Data
July 24, 1971  Germany.................. P 21 37 133.5

[52] U.S. Cl................ 29/527.2, 29/400 N, 176/73, 176/82
[51] Int. Cl........................ B23p 17/00, B23p 25/00
[58] Field of Search...................... 29/527.1, 527.2, 29/400 N; 176/82, 73, 74

[56] References Cited
UNITED STATES PATENTS

| | | | |
|---|---|---|---|
| 3,158,547 | 11/1964 | Smith.............................. | 176/73 X |
| 3,215,607 | 11/1965 | Lackey............................ | 176/73 X |
| 3,230,151 | 1/1966 | Mills et al........................ | 176/73 |
| 3,652,744 | 3/1972 | Dahlberg et al................. | 176/82 X |
| 3,668,283 | 6/1972 | Moreau........................... | 176/71 X |

FOREIGN PATENTS OR APPLICATIONS

| | | | |
|---|---|---|---|
| 597,600 | 5/1960 | Canada............................. | 176/82 |
| 711,368 | 6/1965 | Canada............................. | 176/73 |
| 1,195,206 | 6/1970 | Great Britain.................... | 176/82 |

Primary Examiner—Charles W. Lanham
Assistant Examiner—D. C. Reiley, III
Attorney—Hugh A. Chapin

[57] ABSTRACT

Nuclear fuel rods are manufactured by coating the inner wall of the tubular casing of the fuel rod with a layer of plutonium-containing matrix so that the plutonium is disposed only in the cylindrical outer zone of the uranium-containing nuclear fuel charge. This is done by preparing a suspension of plutonium-containing particles in a lacquer which can be decomposed into carbon by a heat treatment, passing the suspension through the tubular casing and heating the dried coating of the suspension in a protective inert atmosphere until the lacquer is cabonized.

12 Claims, 1 Drawing Figure

3,778,885
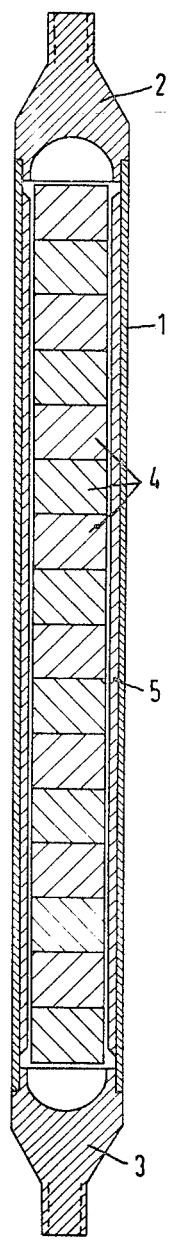

METHOD FOR THE MANUFACTURE OF PLUTONIUM-CONTAINING NUCLEAR FUEL RODS

BACKGROUND OF THE INVENTION

1. Field of the Invention

This invention relates to the field of thermal nuclear reactors, and in particular, to a method for the manufacture of plutonium-containing nuclear fuel rods.

2. Description of the Prior Art

It is well known that the uranium isotope U–238, which itself is not fissionable, is converted in almost all thermal nuclear reactor systems, to a greater or lesser degree, into plutonium through the capture of neutrons. The plutonium consists very largely of fissionable isotopes, which are suitable for reuse as nuclear fuel in thermal nuclear reactors. The re-use of the newly produced fission material is preceded by its recovery from spent nuclear fuel elements in so-called reclamation plants.

Compared with uranium-containing fuel, such as uranium dioxide, which is mainly used in thermal reactors and which has a concentration of fissionable uranium 235 of up to about 4 percent, the percentage of fissionable isotopes is very high in plutonium. With undiluted use of this recovered plutonium, an extremely high power density in the fuel rods equipped with this fuel would result. However, this is technically impossible to manage and, instead, it is necessary to achieve a uniform distribution of the power density over the entire reactor core.

In this connection, it has already been proposed to admix the plutonium to the normal nuclear fuel in relatively small amounts. It has further become known to place the plutonium preferably into the outer zone of the normally used nuclear fuel pellets and also to reduce the temperature gradient in the ceramic material thereby. However, these methods for placing the plutonium into the nuclear fuel are possible only with great technical difficulties and with a correspondingly high expenditure because of the extreme difficulties and danger of handling of plutonium. Therefore, there is an urgent need to find a method for placing plutonium into fuel rods of thermal nuclear reactors which does not have the foregoing disadvantages.

SUMMARY OF THE INVENTION

This invention relates to a method for the manufacture of plutonium-containing nuclear fuel rods for thermal nuclear reactors. The nuclear fuel rods have a tubular casing for the nuclear fuel charge and the tubular casing is closed off by an end cap at each of its two ends. The method of this invention calls for coating the inner wall of the tubular casing with a layer of plutonium-containinG matrix, whereby the plutonium is disposed only in the cylindrical outer zone of the nuclear fuel charge; placing the uranium-containing nuclear fuel charge into the tubular casing, whereby the nuclear fuel charge is disposed in the cylindrical inner zone of the tubular casing; and closing off the tubular casing at each end.

The nuclear fuel charge may consist of pellets or of granular material, which are known in the art. The plutonium and uranium used are preferably in oxide compound form, but in principle other compounds, such as those having a carbon or silicon base, may also be used.

Since the direct application of plutonium to the inner wall of the tubular casing raises problems, the plutonium is embedded in a matrix. The plutonium content of the matrix should be greater than 50 percent by weight. The only materials which can be considered for the matrix are those which are compatible, on the one hand, with the tubular casing itself and, on the other hand, with the plutonium and the rest of the nuclear fuel, respectively. In the present case, carbon was selected for this purpose.

The step of coating the inner wall of the tubular casing with a layer of a plutonium-containing matrix cAlls for: preparing a suspension of plutonium-containing particles in a lacquer which can be decomposed into carbon by a heat treatment; passing this suspension through the tubular casing; allowing a film of such suspension to coat the inner wall of the tubular casing; allowing the excess suspension to drip off the inner wall of the tubular casing; allowing the coating of this suspension on the inner wall of the tubular casing to dry; and heating the dried coating of this suspension in a protective inert atmosphere until the lacquer is carbonized.

DESCRIPTION OF THE DRAWING

FIG. 1 is a longitudinal cross-section of a nuclear fuel rod manufactured according to this method of this invention.

DETAILED DESCRIPTION

Referring to FIG. 1, the fuel rod consists of a tubular casing 1, two end caps 2 and 3 and uranium-containing nuclear fuel charge 4. One end cap 2 is positioned at one end of the fuel rod and the other end cap 3 is positioned at the opposite end of the fuel rod. The end caps 2 and 3 are joined to the fuel rod by soldering or welding in a manner known in the art. The uranium-containing nuclear fuel charge 4 is in pellet form. The layer 5 of plutonium-containing matrix is disposed on the inner wall of the tubular casing 1 and does not quite reach to the end caps 2 and 3. The spacing between the layer 5 and the end caps 2 and 3 is necessary because otherwise the joint between the tubular casing 1 and the end caps 2 and 3 could not be made properly. This spacing can be achieved either by subsequently removing the portion of the layer 5 at each end of the fuel rod or by covering the zones at each end of the fuel rod prior to applying the layer 5, such as by use of the filling funnel which is used for passing the plutonium-containing suspension through the tubular casing 1.

According to the method of this invention, the inner wall of the tubular casing 1 is coated with a layer 5 of plutonium-containing matrix, whereby the plutonium is disposed only in the cylindrical outer zone of the nuclear fuel charge 4. Then, the uranium-containing nuclear fuel charge 4 is placed in the tubular casing 1, whereby the nuclear fuel charge 4 is disposed in the cylindrical inner zone of the tubular casing 1. Then, the tubular casing 1 is closed off at each end by use of the end caps 2 and 3.

The step of closing off the tubular casing 1 at each end calls for: joining the first end cap 3 to one of the ends of the tubular casing 1, such as the lower end of the tubular casing 1 as shown in FIG. 1, after coating the inner wall of the tubular casing with a layer 5 of plutonium-containing matrix and before placing the uranium-containing nuclear fuel charge 4 in the tubular casing 1; and then joining the second end cap 2 on the opposite end of the tubular casing 1 from the first end cap 3 to close off the tubular casing 1 after placing the uranium-containing fuel charge 4 in the tubular casing 1.

The step of coating the inner wall of the tubular casing with a layer 5 of a plutonium-containing matrix calls for: preparing a suspension of plutonium-containing particles in a lacquer which can be decomposed into carbon by a heat treatment; passing this suspension through the tubular casing 1; allowing a film of such suspension to coat the inner wall of the tubular casing 1; allowing the excess suspension to drip off the inner wall of the tubular casing 1; allowing the coating of this suspension on the inner wall of the tubular casing 1 to dry; and heating the dried coating of this suspension in a protective inert atmosphere until the lacquer is carbonized.

As a result of heating the dried coating of said suspension until the lacquer is carbonized, the plutonium-containig particles are embedded in a carbon matrix. In preparing the suspension ef plutonium-containing particles in a lacquer, the concentration of the plutonium-containing particles in the suspension should be regulated so that, in the carbonized lacquer coating on the inner wall of the tubular casing 1, the ratio of the amount of carbon to plutonium is in the range of 1:5 to 1:20. Such a concentration can easily be achieved by one skilled in the art.

The plutonium-containing particles should be as small as possible. In preparing the suspension of plutonium-containing particles, one should use plutonium-containing particles having a diameter of less than 10 $\mu$ and preferably less than 1 $\mu$. This is necessary so that the suspension always has the same concentration and that the layer 5 formed on the inner wall of the tubular casing 1 has a uniform percentage of plutonium.

The thickness of the layer 5 formed on the inner wall of the tubular casing 1 should be in the range of 10 to 100 $\mu$. This thickness can be achieved by regulating the viscosity of the suspension. If necessary, the suspension may be passed through the tubular casing several times, with appropriate drying and carbonizing of the suspension each time it is passed through the tubular casing.

The suspension used for the prepartion of the layer 5 of plutonium-containing matrix consists of a nitrocellulose lacquer or a secondary cellulose acetate lacquer and plutonium oxide particles. The plutonium oxide particles may be prepared from Pu oxalate of a particle size smaller than 10 $\mu$. The viscosity required for adjusting the thickness of the layer 5 can be regulated by means of a thinner. The carbonizing temperature of the lacquers in flowing, high purity argon is about 250°C. and therefore does not detrimentally affect the metallurgical properties of the tubular casing 1. The tubular casing 1 may consist of steel or zirconium alloys.

Other lacquers which can be decomposed into carbon can also be used, but it is essential that they have no residues which are highly neutron-absorbing.

The steps used in this method can be automatized without difficulty, which is of particular advantage in view of the safety regulations pertaining to the processing of plutonium.

In the foregong specification, the invention has been described in reference to specific exemplary methods. It will be evident, however, that variations and modifications in the methods explained by way of illustration may be made without departing from the broader scope and spirit of the invention as set forth in the appended claims. The specification and drawing are accordingly to be regarded in an illustrative rather than in a restrictive sense.

What is claimed is:

1. Method for the manufacture of plutonium-containing nuclear fuel rods for thermal nuclear reactors, said nuclear fuel rods having a tubular casing for the nuclear fuel charge, comprising the steps of:
    a. coating the inner wall of the tubular casing with a layer of plutonium-containing matrix, whereby the plutonium is disposed only in the cylindrical outer zone of the nuclear fuel charge;
    b. placing the uranium-containing nuclear fuel charge into the tubular casing, whereby the nuclear fuel charge is disposed in the cylindrical inner zone of the tubular casing; and
    c. closing off the tubular casing at each end.
2. Method according to claim 1 wherein the plutonium content of said matrix is greater than 50 percent by weight.
3. Method according to claim 1 wherein the plutonium and uranium used are in oxide compound form.
4. Method according to claim 1 wherein the coating of a layer of plutonium-containing matrix is applied in a thickness in the range of 10 $\mu$ to 100 $\mu$.
5. Method according to claim 1 wherein the step of coating the inner wall of the tubular casing with a layer of a plutonium-containing matrix, comprises:
    a. preparing a suspension of plutonium-containing particles in a lacquer which can be decomposed into carbon by a heat treatment;
    b. passing said suspension through the tubular casing;
    c. allowing a film of said suspension to coat the inner wall of the tubular casing;
    d. allowing the excess suspension to drip off the inner wall of the tubular casing;
    e. allowing the coating of said suspension on the inner wall of the tubular casing to dry; and
    f. heating the dried coating of said suspension in a protective inert atmosphere until the lacuqer is carbonized.
6. Method according to claim 5 wherein the step of preparing a suspension oF plutonium-containing particles ina lacquer, comprises regulating the concentration of the plutonium-containing particles in the suspension so that in the carbonized lacquer coating on the inner wall of the tubular casing the ratio of the amount of carbon to plutonium is in the range of 1:5 to 1:20.
7. Method according to claim 5 wherein the step of preparing a suspension of plutonium-containing particles comprises using plutonium-containing particles having a diameter of less than 10 $\mu$.
8. Method according to claim 5 wherein the step of preparing a suspension of plutonium-containing particles comprises using plutonium-containing particles having a diameter of less than 1 $\mu$.
9. Method according to claim 5 wherein the step of preparing a suspension of plutonium-containing particles comprises regulating the viscosity of the suspension so that the thickness of the layer on the inner wall of the tubular casing is in the range of 10 $\mu$ to 100 $\mu$.
10. Method according to claim 1 wherein the step of closing off the tubular casing at each end comprises:

a. joining a first end cap to one of the ends of the tubular casing after coating the inner wall of the tubular casing with a layer of plutonium-containing matrix and before placing the uranium-containing nuclear fuel charge in the tubular casing; and b. joining a second end cap on the opposite end of the tubular casing from said first end cap to close off the tubular casing after placing the uranium-containing nuclear fuel charge in the tubular casing.

11. Method according to claim 1 and further comprising the additional step of providing a space on the inner wall of the tubular casing at each end of the fuel rod between the layer of plutonium-containing matrix and the end capS.

12. Method according to claim 11 wherein said sapce provided at each end of the fuel rod is achieved by covering the zones on the inner wall of the tubular casing at each end of the fuel rod prior to applying the layer of plutonium-containing matrix.

* * * * *